United States Patent
Nagarajan et al.

(10) Patent No.: US 12,282,853 B2
(45) Date of Patent: Apr. 22, 2025

(54) ACCELERATED EMBEDDING LAYER COMPUTATIONS

(71) Applicant: Google LLC, Mountain View, CA (US)

(72) Inventors: Rahul Nagarajan, Sunnyvale, CA (US); Lifeng Nai, Sunnyvale, CA (US); George Kurian, Sunnyvale, CA (US); Hema Hariharan, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/582,294

(22) Filed: Feb. 20, 2024

(65) Prior Publication Data
US 2024/0273363 A1    Aug. 15, 2024

Related U.S. Application Data

(63) Continuation of application No. 18/305,297, filed on Apr. 21, 2023, now Pat. No. 11,948,086, which is a (Continued)

(51) Int. Cl.
*G06N 3/08* (2023.01)
*G06F 1/03* (2006.01)
(Continued)

(52) U.S. Cl.
CPC ................. *G06N 3/08* (2013.01); *G06F 1/03* (2013.01); *G06N 3/063* (2013.01); *G06N 20/10* (2019.01)

(58) Field of Classification Search
CPC .......... G06N 3/08; G06N 3/063; G06N 20/10; G06N 3/0454; G06N 3/04; G06N 3/0445;
(Continued)

(56) References Cited

U.S. PATENT DOCUMENTS
7,139,739 B2    11/2006    Agrafiotis et al.
9,300,581 B1    3/2016    Hui et al.
(Continued)

FOREIGN PATENT DOCUMENTS
CN    106991105 A    7/2017
CN    107454965 A    12/2017
(Continued)

OTHER PUBLICATIONS
Extended European Search Report in European Appln. No. 20199770.7, mailed on Mar. 2, 2021, 9 pages.
(Continued)

*Primary Examiner* — Michael S Osinski
(74) *Attorney, Agent, or Firm* — Fish & Richardson P.C.

(57) ABSTRACT

Methods, systems, and apparatus, including computer-readable media, are described for performing neural network computations using a system configured to implement a neural network on a hardware circuit. The system includes a host that receives a batch of inputs to a neural network layer. Each of the inputs is stored in a memory location identified by an address. The system identifies one or more duplicate addresses in a listing of addresses for one or more inputs. For each duplicate address: the system generates a unique identifier that identifies the duplicate address in the listing of addresses. The system (i) obtains first inputs from memory locations identified by addresses corresponding to the unique identifiers and (ii) generates an output of the layer from the obtained first inputs.

16 Claims, 9 Drawing Sheets

Related U.S. Application Data continuation of application No. 16/659,527, filed on Oct. 21, 2019, now Pat. No. 11,651,209.

(60) Provisional application No. 62/909,667, filed on Oct. 2, 2019.

(51) Int. Cl.
*G06N 3/063* (2023.01)
*G06N 20/10* (2019.01)

(58) Field of Classification Search
CPC ........ G06N 3/0481; G06N 7/005; G06F 1/03; G06F 2212/7201; G06F 2207/4824; G06F 2212/7203; G06F 2212/7207; G06F 7/5443; G06F 7/53; G11C 29/10; G11C 29/44; G11C 29/785; H03M 7/30
See application file for complete search history.

(56) References Cited

U.S. PATENT DOCUMENTS

| | | | |
|---|---|---|---|
| 10,354,015 B2 | 7/2019 | Kalchbrenner et al. | |
| 11,212,219 B1 | 12/2021 | Iorga et al. | |
| 11,429,573 B2 | 8/2022 | Patel et al. | |
| 11,507,299 B2 | 11/2022 | Lee et al. | |
| 11,507,797 B2* | 11/2022 | Motoya | G06N 3/08 |
| 11,886,979 B1* | 1/2024 | Duong | G06N 3/063 |
| 2015/0006600 A1 | 1/2015 | Cho et al. | |
| 2017/0169332 A1* | 6/2017 | Graves | G06N 3/082 |
| 2017/0228637 A1* | 8/2017 | Santoro | G06N 3/063 |
| 2018/0005106 A1* | 1/2018 | Hachiya | G06N 3/045 |
| 2018/0047459 A1* | 2/2018 | Kim | G11C 29/52 |
| 2018/0090227 A1 | 3/2018 | Lee et al. | |
| 2018/0150256 A1 | 5/2018 | Kumar et al. | |
| 2018/0152366 A1 | 5/2018 | Cornett et al. | |
| 2018/0157712 A1 | 6/2018 | Vestgote | |
| 2018/0260220 A1* | 9/2018 | Lacy | G06F 9/3887 |
| 2019/0073580 A1 | 3/2019 | Dzhulgakov et al. | |
| 2019/0073590 A1 | 3/2019 | Wu et al. | |
| 2019/0146911 A1 | 5/2019 | Ha et al. | |
| 2019/0164036 A1 | 5/2019 | Kim et al. | |
| 2019/0294413 A1 | 9/2019 | Vantrease et al. | |
| 2019/0294972 A1 | 9/2019 | Keller et al. | |
| 2019/0303749 A1 | 10/2019 | Appuswamy et al. | |
| 2019/0314985 A1 | 10/2019 | Sermanet | |
| 2020/0192742 A1 | 6/2020 | Boettcher et al. | |
| 2020/0219575 A1 | 7/2020 | Ha et al. | |
| 2020/0349229 A1 | 11/2020 | Abudalfa et al. | |
| 2020/0409845 A1 | 12/2020 | Lee et al. | |
| 2021/0050069 A1 | 2/2021 | Ning | |
| 2021/0065833 A1 | 3/2021 | Patrascu | |
| 2021/0295138 A1 | 9/2021 | Symes et al. | |
| 2022/0100518 A1 | 3/2022 | Tomei et al. | |
| 2022/0100718 A1 | 3/2022 | Arelakis et al. | |
| 2022/0188597 A1* | 6/2022 | Richter | G06V 10/94 |
| 2022/0253419 A1 | 8/2022 | Karlberg et al. | |
| 2024/0396568 A1* | 11/2024 | Liu | H03M 1/181 |

FOREIGN PATENT DOCUMENTS

| | | |
|---|---|---|
| CN | 109409516 | 3/2019 |
| EP | 2303569 | 8/2010 |
| JP | 2014-225089 | 12/2014 |
| JP | 2018-181173 | 11/2018 |
| KR | 10-2017-0133364 A | 12/2017 |
| TW | 201839676 | 11/2018 |
| TW | 201928712 | 7/2019 |
| TW | 201937416 | 9/2019 |
| WO | WO 2018093926 | 5/2018 |
| WO | WO 2018093935 | 5/2018 |
| WO | WO 2018213840 | 11/2018 |

OTHER PUBLICATIONS

International Preliminary Report on Patentability in International Appln. No. PCT/US2020/053442, mailed on Apr. 14, 2022, 8 pages.
International Search Report and Written Opinion in International Appln. No. PCT/US2020/053442, mailed on Feb. 1, 2021, 13 pages.
Office Action in European Appln. No. 20199770.7, mailed on Jan. 19, 2024, 8 pages.
Office Action in European Appln. No. 20199770.7, mailed on Jan. 3, 2023, 7 pages.
Office Action in Taiwanese Appln. No. 109134099, mailed on Apr. 15, 2024, 9 pages (with English translation).
Office Action in Taiwanese Appln. No. 109134099, mailed on Sep. 26, 2024, 14 pages (with machine translation).
Extended European Search Report in European Appln. No. 24207721.2, mailed on Nov. 13, 2024, 10 pages.
Office Action in Japanese Appln. No. 2023-125258, mailed on Oct. 29, 2024, 5 pages (with machine translation).
Notice of Allowance in Korean Appln. No. 10-2022-7005451, mailed on Dec. 23, 2024, 4 pages (with English translation).
Office Action in Chinese Appln. No. 202080060592.X, mailed on Dec. 1, 2024, 19 pages (with machine translation).
Office Action in Japanese Appln. No. 2023-125258, mailed on Mar. 4, 2025, 7 pages (with machine translation).

* cited by examiner

RECEIVE A BATCH OF INPUTS TO A NEURAL NETWORK LAYER, EACH INPUT BEING STORED IN A MEMORY LOCATION IDENTIFIED BY AN ADDRESS
602

SCATTER CIRCUIT IDENTIFIES DUPLICATE ADDRESSES IN A LISTING OF ADDRESSES FOR EACH INPUT IN THE BATCH OF INPUTS
604

FOR EACH DUPLICATE ADDRESS: SCATTER CIRCUIT GENERATES A UNIQUE IDENTIFIER THAT IDENTIFIES THE DUPLICATE ADDRESS IN THE LISTING OF ADDRESSES
606

GENERATE A FILTERED ADDRESS LIST FOR THE BATCH OF INPUTS BASED ON UNIQUE IDENTIFIERS GENERATED BY THE SCATTER CIRCUIT
608

OBTAIN FIRST INPUTS FROM MEMORY LOCATIONS IDENTIFIED BY ADDRESSES CORRESPONDING TO THE UNIQUE IDENTIFIERS IN THE FILTERED ADDRESS LIST
610

GENERATE AN OUTPUT OF THE NEURAL NETWORK LAYER FROM THE OBTAINED FIRST INPUTS
612

Fig. 6

ACCELERATED EMBEDDING LAYER COMPUTATIONS

CROSS REFERENCE TO RELATED APPLICATION

This application is a continuation of U.S. patent application Ser. No. 18/305,297, filed Apr. 21, 2023, which is a continuation of U.S. patent application Ser. No. 16/659,527, filed Oct. 21, 2019, now U.S. Pat. No. 11,651,209 issued on May 16, 2023, which claims the benefit of U.S. Provisional Application No. 62/909,667, filed on Oct. 2, 2019, the contents of which are incorporated herein by reference in their entirety.

BACKGROUND

This specification generally relates to using circuitry to perform neural network computations.

Neural networks are machine-learning models that employ one or more layers of nodes to generate an output, e.g., a classification, for a received input. Some neural networks include one or more hidden layers in addition to an output layer. The output of each hidden layer is used as input to one or more other layers in the network, e.g., other hidden layers or the output layer of the network. Some of the layers of the network generate an output from a received input in accordance with current values of a respective set of parameters.

Some neural networks are convolutional neural networks (CNNs) (e.g., for image processing) or recurrent neural networks (RNNs) (e.g., for speech and language processing). Each of these neural networks include respective sets of convolutional or recurrent neural network layers. A neural network layer can have an associated set of kernels as well as an embedding layer for processing inputs to generate sets of vectors for training a neural network. Kernels can be represented as a tensor, i.e., a multi-dimensional array, of weights. As an example, embedding layers can process a set of inputs, such as inputs of image pixel data or activation values generated by a neural network layer. The set of inputs or set of activation values can also be represented as a tensor.

SUMMARY

This document describes techniques for accelerating computations of an embedding layer of an artificial neural network. The techniques can be used in a computing system, such as a large-scale distributed system, that includes circuitry configured to perform deduplication operations on a listing of addresses. The deduplication operations are performed to reduce load-imbalances on a distributed system during processing of the inputs at an embedding layer of a neural network, such as during an example forward pass compute of the embedding layer.

One aspect of the subject matter described in this specification can be embodied in a method for performing neural network computations using a system that is configured to implement a neural network on a hardware circuit. The method includes: receiving, by a host, a batch of inputs to a neural network layer, wherein each input in the batch of inputs is stored in a memory location identified by an address; and identifying one or more duplicate addresses in a listing of addresses for one or more inputs in the batch of inputs. For each duplicate address, the method includes generating a unique identifier that identifies the duplicate address in the listing of addresses, obtaining, for the batch of inputs, first inputs from memory locations identified by addresses corresponding to the unique identifier; and generating an embedding output of the neural network layer from the obtained first inputs.

These and other implementations can each optionally include one or more of the following features. For example, in some implementations, the neural network layer is an embedding layer of the neural network, the embedding output includes an embedding feature vector, and the method further includes: determining, by a scatter circuit of the system, a reverse mapping of the unique identifier to duplicate addresses for specific inputs in the batch of inputs to the embedding layer; and generating one or more embedding feature vectors as outputs of the embedding layer based on the reserve mapping of the unique identifier to the duplicate addresses for the specific inputs.

In some implementations, the method further includes: generating a filtered address list for the batch of inputs based on one or more unique identifiers; determining, for addresses included in the filtered address list, a partitioning of addresses among each processor of a plurality of processors; and wherein obtaining the first inputs includes: obtaining, for each partition of addresses, first inputs from memory locations identified by addresses in the partition of addresses using a respective processor that is assigned to retrieve inputs from the partition of addresses.

In some implementations, generating the embedding output of the neural network layer based on the reserve mapping includes: parsing the listing of addresses that includes the duplicate addresses to map embedding feature vectors generated for duplicate addresses, corresponding to unique identifiers, back to the specific inputs in the batch of inputs to the neural network layer.

The method may further include: providing, by a requesting processor and to a remote processor, an address for a first input that corresponds to a unique identifier and a request for the first input; receiving, by the requesting processor and from the remote processor, the first input stored at a memory location of a data shard assigned to the remote processor; and performing one or more reduction operations to generate the embedding output of the neural network layer from first inputs obtained from the data shard.

In some implementations, the listing of addresses is for a batch of inputs that form a sample of input features including multiple sets of input features and generating the unique identifier includes: generating the unique identifier for each duplicate address across respective sets of input features in the sample of input features. In some implementations, determining the reverse mapping of the unique identifier to duplicate addresses includes: determining the reverse mapping of the unique identifier to duplicate addresses for specific inputs across the multiple sets of input features.

In some examples, each partition of addresses is assigned to a data shard of activation values or gain values that correspond to vector elements of a multi-dimensional sparse tensor; and each data shard of activation values or gain values is assigned to a particular processor for multiplying with a corresponding weight vector to perform the neural network computations. In some implementations, a duplicate address is a particular address for a memory location that stores an input to a neural network layer, the particular address is common among a corresponding data shard for each processor of the plurality of processors, and the particular address is duplicated among (i) the set of input features or (ii) the sample of input features.

Generating the embedding output of the neural network layer can include: providing, to a requesting processor and from a remote processor, multiple inputs stored across memory locations of a data shard assigned to the remote processor core; and performing a look-up to obtain a corresponding vector of weights that includes a respective weight value for multiplying with an input of the multiple inputs to generate partial activations for a subsequent neural network layer. In some implementations, a portion of the multiple inputs is received from memory locations identified by non-duplicate addresses or from memory locations identified by addresses for which no duplicate address exists in the original list.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular embodiments so as to realize one or more of the following advantages. A computing system includes circuitry that can be used to implement a processing scheme for accelerating embedding layer processes for multiple batches of inputs. The circuitry and processing scheme can be used to reduce or mitigate load-imbalances on a multi-core processing unit, e.g., a distributed system of processors, by filtering out duplicate addresses in an address listing used to retrieve inputs to an embedding layer of a neural network.

Having multiple duplicate addresses can be particularly problematic when computing or updating embeddings for a neural network. For example, samples in a batch of inputs can include a variable number of features that need to be embedded, such as in a feature space of an embedding layer of a neural network. Each feature (or input) value has an embedding, e.g., a vector of values that represent trainable weights of a neural network that are stored in an embedding table of the neural network. While each value in a sample (or batch) has an embedding, different samples in a batch (and even different features within the same sample) can include the same feature value. In some cases, even the same feature within a sample can include the same feature value.

For example, when computing or updating embeddings, the same feature value may need to be fetched for the same embedding table but for different features in a sample or batch, or for various features in different samples or batches of inputs. Because the same input value may need to be fetched multiple times (e.g., from the same address in memory), when computing or updating embeddings, methods for filtering out duplicate occurrences of addresses can reduce the computing load on a distributed system and help to improve or accelerate computations of an embedding layer of a neural network.

Techniques for deduplication can be performed at a source or requesting processor before addresses in a listing are broadcast to distinct remote processors of a distributed system that are assigned to retrieve specific data elements of a given batch of inputs for processing at the embedding layer. The techniques described in this document can be used to more efficiently compute an embedding output of a neural network layer from the data elements retrieved for an input in a batch. For example, a process of generating an embedding output can include retrieving embeddings for one or more inputs in a batch and performing a reduction on the embeddings for related input features in the batch.

Relative to prior systems, the techniques described in this specification can be used to reduce or minimize the amount of computations that are performed to retrieve the embeddings data, to perform the reductions, and to return reduced vectors of embedding values. When generating embedding layer outputs, the techniques provide an improved method of balancing the compute load between a requesting processor that processes the reduced embedding values for a batch of inputs and the remote processors that retrieve the embeddings corresponding to the inputs in the batch.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 6 is a flow diagram that illustrates an example process for generating an output of a neural network layer.

Like reference numbers and designations in the various drawings indicate like elements.

DETAILED DESCRIPTION

Figure 1:
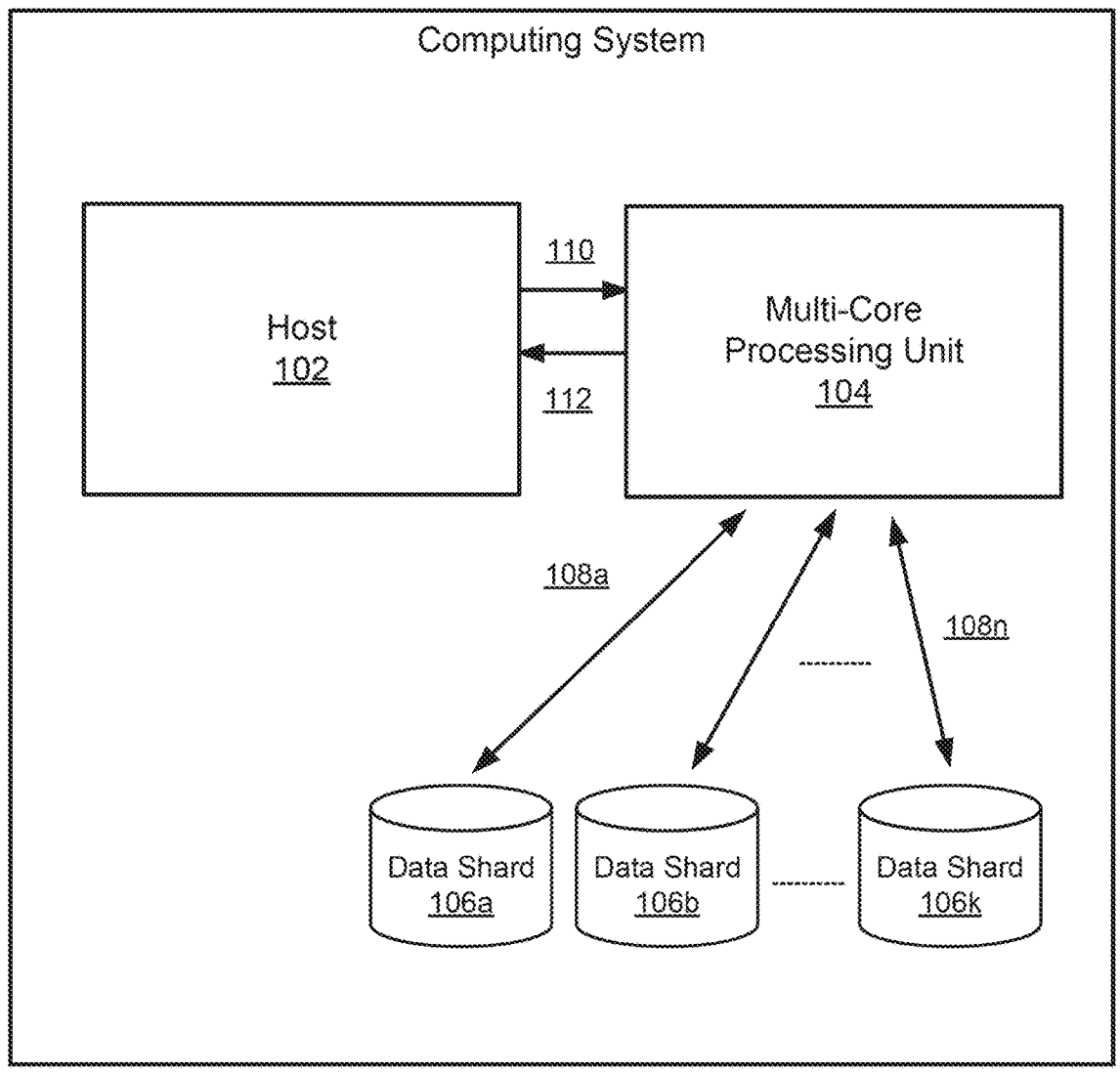
FIG. 1 is a block diagram of an example computing system.

This specification describes techniques for accelerating embedding layer computations to mitigate processing delays that can occur due to processor load-imbalances in a distributed computing system. For example, the delays may occur during processor computations for generating an output of an embedding layer of a multi-layer neural network. Specifically, when a particular processor or core of a distributed system is required to perform a substantial number of look-up and compute operations (e.g., reductions or concatenations of retrieved values) to generate an embedding, this particular processor can experience processing delays corresponding to a load-imbalance.

The imbalance can be between a source processor that submits a request to lookup or retrieve data for an input value and a remote processor that performs the lookup to retrieve the data. The data can be embeddings (e.g., weights) of an embedding table and a remote processor may be tasked to process the request to return the data or weight values for the embeddings. For example, in a forward pass compute operation of an embedding layer, remote processors process a request from a source that causes the remote processors to look-up addresses to retrieve data stored in memory and to perform computations using the retrieved data. In prior distributed architectures remote processors performed minimal deduplication of addresses specified in a request.

For example, in prior systems a remote processor received one or more duplicate addresses and performed data retrieval and associated reduction operations corresponding to inputs for all received addresses, including the duplicate addresses. But, the architecture and processing scheme used by some prior systems are prone to load-imbalance issues, particularly when a compute load at one or more remote processors is not balanced with a compute load at a source processor or is not balanced among two or more remote processors. These load-imbalances can stall or substantially delay compute operations for generating an output for the embedding layer.

In general, an embedding layer of a neural network is used to embed features in a feature/embedding space corresponding to the embedding layer. A feature can be an attribute or property that is shared by independent units on which analysis or prediction is to be performed. For example, the independent units can be groups of words in a vocabulary or image pixels that form parts of items such as images and other documents. An algorithm for training embeddings of an embedding layer can be executed by a neural network processor to map features to embedding vectors. In some implementations, embeddings of an embedding table are learned jointly with other layers of the neural network for which the embeddings are to be used. This type of learning occurs by back propagating gradients to update the embedding tables.

In other implementations, the embeddings may be learned separately from the other layers of the neural network for which the embeddings are to be used, such as when embeddings are pre-trained. For example, the algorithm can be used by the neural network processor to compute embeddings by processing information about discrete input features to determine a mapping or placement of similar inputs to embedding vectors that are geometrically close in the embedding space. In some cases, the process of computing embeddings can represent a technique for feature learning or feature engineering that allows a system to automatically discover representations needed for feature detection from raw input data.

In some implementations, a given "input" can have one or more features of one or more types, and the embedding layer generates a respective embedding for each of those types. For example, an input can be for a search query that has a few different feature types. The feature types can include properties of a user or user device (e.g., location, preferences, device type, etc.), query tokens, previously submitted queries, or other related types that may correspond to attributes of a search query. For any feature types that have more than one feature for a given input, a computing system is operable to retrieve the individual embeddings for each of those features. The system is also operable to combine the retrieved embeddings, e.g., by computing averages of the embedding values, to generate a final embedding for that feature type.

Based on the context discussed above, this specification describes techniques for implementing a special-purpose hardware circuit configured to perform deduplication of addresses at a source processor before sending a listing of addresses to a remote processor for look-up in a portion of memory assigned to the remote processor. The hardware circuit includes an identifier (ID) scatter circuit ("scatter circuit") that is configured to parse an original list of addresses to filter out one or more "duplicate" addresses. The scatter circuit is configured to filter the duplicate addresses before bucketing addresses that belong to each remote processor.

For example, a system that includes the hardware circuit can generate instructions to cause the scatter circuit to bucket addresses that belong to a data shard assigned to a particular remote processor of the system. The system then sends the addresses to certain remote processors that are assigned to data shards storing embedding vectors corresponding to inputs (features) stored at the addresses. The embedding vectors may be portions of weight values or embeddings of an embedding table that is stored across the data shards. In some cases, embedding vectors of an embedding table can be split among multiple remote processors (processor nodes or cores) of a computing system. A system host is operable to send a set of addresses or vector indices to a subset of remote processors to perform operations associated with retrieving a vector of weights, such as an embedding vector, that is mapped to a particular feature stored at an address in the set. In some examples, the remote processors perform one or more lookup and compute operations before providing or returning a weight vector to the system host.

The hardware circuit includes a reverse mapper that is configured to augment or modify an address by adding metadata, such as a hashed key, to the address. The metadata is used to reverse map a specific set of retrieved or computed data (e.g., a gathered vector) back to a corresponding original address prior to the filtering of the duplicate addresses. In some cases, the circuit can be configured to perform a sparse reduction operation on the data received from a remote core to form a dense matrix.

For example, the circuit is enhanced to walk each address in the original list of address locations, before deduplication, and use metadata tags generated by the reverse mapper to gather vectors outputs corresponding to a particular input address and to perform a reduction operation on the gathered vectors. These techniques allow computation in a distributed system of processors to be performed by a particular primary processor that owns the processing of multiple batches of inputs instead of by the remote processor that is mapped to a particular portion of memory that holds weight values (e.g., parameters) corresponding to one or more inputs in a batch of inputs.

FIG. 1 shows a block diagram of an example computing system 100 that is configured to retrieve data elements stored in a memory of system 100 for performing embedding layer operations to generate sets of embeddings for training a neural network. In some cases, training a neural network can include determining one or more learning targets based on output vectors that represent embeddings of the neural network. For example, embedding outputs can correspond to one or more output feature sets that include a vector of floats/parameters for a given output dimension (64-d, 256-d, etc.).

Embedding outputs are generated when a neural network of system 100 is trained to perform certain computational functions, such as image or speech recognition. In some implementations, training the neural network involves updating a set of embeddings that were previously stored in an embedding table of the neural network, such as during a prior phase of training the neural network. In other words, embeddings for a neural network may be pre-trained. For example, the embeddings of an embedding layer of a neural network may not be trained jointly with the neural network for which the embeddings are to be used. Hence, the techniques described in this specification can be used to update embeddings of a pre-trained neural network, with improved efficiency over prior approaches, such as an approach which may have been used to pre-train the embeddings.

The computing system 100 includes a host 102, a multi-core processing unit 104, and data shards 106a-106k, where k is an integer greater than one. In general, the host 102 can be a processing unit, such as a processor, multiple processors, or multiple processor cores. Hence, the host 102 may include one or more processors, and is operable to generate or process an instruction for accessing a target dense matrix and to send an instruction 110 to the multi-core processing unit 104 to generate the target dense matrix. As described in more detail below, performing embedding layer operations can include transforming sparse elements from one or more matrices to generate a dense matrix.

The multi-core processing unit 104 accesses the corresponding elements 108a-108n from one or more of the data shards 106a-106k, where n is an integer greater than one. The multi-core processing unit 104 generates the target dense matrix 112 using the corresponding elements 108a-108n, and provides the target dense matrix 112 to the host 102 for further processing. The elements 108a-108n may be two-dimensional matrices having different sizes, and the multi-core processing unit 104 may generate the target dense matrix 112 by transforming each of the elements 108a-108n into a vector, and concatenating the n vectors into a single vector.

Generally, in the context of embeddings, 'sparse' information corresponding to the sparse elements may be a one-hot vector that identifies a feature value. For example, if there are five possible values for a given feature (e.g., A, B, C, D, E), the sparse vector would identify the feature value 'A' as (1, 0, 0, 0, 0) and the embedding layer would map (1, 0, 0, 0, 0) to a dense embedding vector for the feature value "A." In some implementations, during the training of an embedding layer to learn embeddings, the elements 108a-108n may be weight values of an embedding table that are transformed into a vector, such as an embedding vector for the feature value "B" or "C." The weight values may be transformed using a neural network processor of the multi-core processing unit 104 that executes a training algorithm to compute embeddings based at least on a mapping of features to embedding vectors.

The host 102 can process an instruction for updating a target dense matrix and sends an updated dense matrix to the multi-core processing unit 104. For example, a target dense matrix may correspond to an embedding of a pre-trained neural network. Hence, the host 102 can process an instruction to update embeddings of the pre-trained neural network to generate an updated dense matrix. For example, during a subsequent iteration of training a neural network to update embeddings a backward pass may be performed to update the embeddings by determining a new mapping of input features to embedding vectors and generating an updated dense matrix based on the new mapping. In some implementations, the multi-core processing unit 104 is operable to transform the updated dense matrix into corresponding sparse elements and to update one or more sparse elements (e.g., weights) stored in the data shards 106a-106k accordingly.

As indicated above, the host 102 is configured to process instructions for execution within the computing system 100. In some implementations, the host 102 is configured to process the target dense matrix 112 generated by the multi-core processing unit 104. In some other implementations, the host 102 may be configured to request the multi-core processing unit 104 to generate the target dense matrix 112, and another processing unit may be configured to process the target dense matrix 112.

Each processor of the multi-core processing unit 104 is configured to retrieve data elements stored in a memory of system 100. The memory can include multiple data shards 106a-106k that store data including elements 108a-108n. The data can include inputs, activations, gain values, or weight values corresponding to parameters or kernels of a matrix structure of weights. In some implementations, the data shards 106a-106k may be a volatile memory unit or units. In some other implementations, the data shards 106a-106k may be a non-volatile memory unit or units. The data shards 106a-106k may also be another form of computer-readable medium, such as devices in a storage area network or other configurations. The data shards 106a-106k may be coupled to the multi-core processing unit 104 using electrical connections, optical connections, or wireless connections. In some implementations, the data shards 106a-106k may be part of the multi-core processing unit 104 and based on a Processor-in-memory (PIM) architecture.

The multi-core processing unit 104 is configured to determine a dense matrix based on sparse elements. In some implementations, the multi-core processing unit 104 may be configured to determine locations of sparse elements based on a dense matrix. The multi-core processing unit 104 includes multiple interconnected processors or processor cores. For example, the multi-core processing unit 104 can be a distributed processing system that includes multiple interconnected processor cores. In general, the terms "processor" and "processor core" may be used interchangeably to describe discrete interconnected processing resources of the multi-core processing unit 104.

Figure 2:
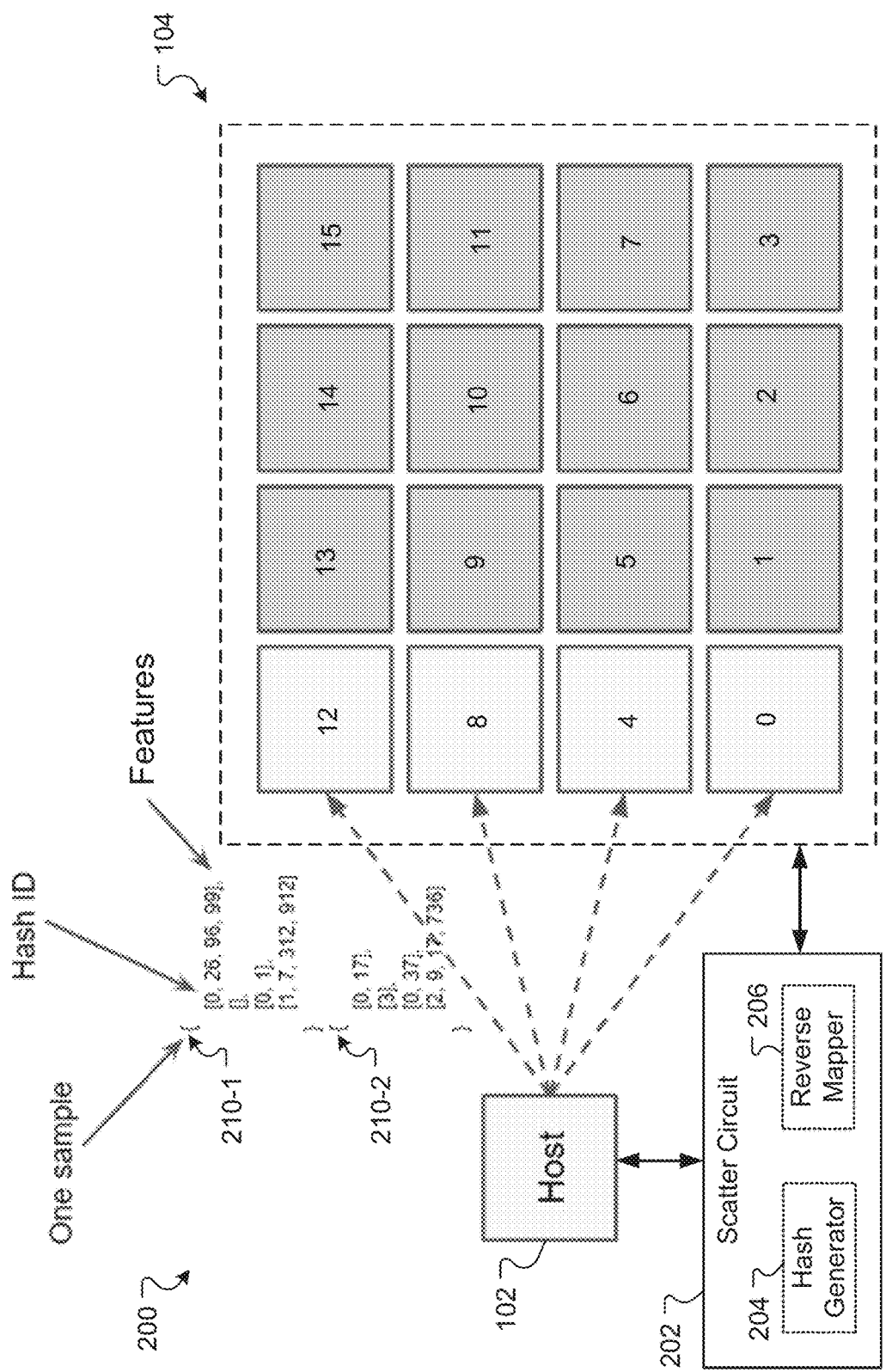
FIG. 2 is a block diagram of an example circuit that includes an example multi-core processing unit.

FIG. 2 is a block diagram of an example special-purpose hardware circuit 200 that includes the multi-core processing unit 104. In general, the computing system 100 can be implemented using one or more of the circuit 200 (described below). In the implementation of FIG. 2 multi-core processing unit 104 has a set of interconnected processors that includes processors 0 through 15. Each of processors 0-15 of the multi-core processing unit 104 can be assigned to one or more of the data shards 106a-106k to obtain data (e.g., feature values and weights) stored in memory locations of the data shards assigned to the processor, as described in more detail below. Each processor of the multi-core processing unit 104 is operable to fetch or retrieve data from memory locations identified by addresses received in a request from the host 102 or from another processor in the multi-core processing unit 104.

The processors cooperate to retrieve data elements that are mapped to an embedding table. The data elements are retrieved to perform embedding layer operations, such as computations for generating output vectors (e.g., dense vectors) that represent embeddings of a neural network. In some implementations, an embedding output is a mapping of discrete inputs in batches of inputs to a dense vector of numerical values (e.g., floating-point values) that can be used to define relationships between objects, such as terms or words in a vocabulary. For one input in a given batch, an embedding may be a vector, whereas for an entire batch of inputs, an embedding may be a matrix, e.g., a collection of vectors. In some implementations, vectors of embedding values correspond to trainable weights that are learned by a neural network during training. Learned weights can encode one or more words by looking up a dense vector stored in an embedding table, where the dense vector corresponds to a particular word. Multiple dense vectors can correspond to a dense matrix that is used to train a neural network to perform a particular task or function related to recognizing a sequence of words, e.g., for language processing.

In some examples, embedding layer computation is a large-scale data look-up problem that is typically used during a training phase of a neural network. For example, during training, a large table of weight values may be sharded or partitioned across the various dimensions of a multi-dimensional tensor, such as across an x-dimension, y-dimension, or z-dimension of the multiple dimensional tensor. Specifically, the table of weight values can be sharded across data shards 106a-106k, such that individual weight values are stored at respective locations in a memory that includes the data shards.

Further, one or more of the data shards 106a-106k can be partitioned to a particular processor 0-15 in the multi-core processing unit 104. Each shard or partition of the table corresponds to a data shard 106k that is assigned to a particular processor or processor core of the multi-core processing unit 104. In some examples, each processor core is a respective neural network processor. In other examples, each processor core is a respective core of a single neural network processor. In general, the computing system 100 can include multiple processors or multiple processor cores based on a desired configuration of the system.

Referring again to FIG. 2 and hardware circuit 200, the circuit includes identifier (ID) scatter circuit 202 ("scatter circuit 202"), which includes a hash generator 204 and a reverse mapper 206. Each of the hash generator 204 and reverse mapper 206 are described below.

The scatter circuit 202 is configured to process an original list of addresses that may be received by the host 102. The original address listing identifies memory locations in a memory of system 100, such as a memory that includes the data shards 106a-106k. At FIG. 2, the scatter circuit 202 is shown as being external to, or separate from, the host 102 and the multi-core processing unit 104. However, in some implementations, the scatter circuit 202 can be included as part of the host 102, for example, as a scatter unit or computing module, or sub-circuit of the host 102.

Similarly, in some implementations, the scatter circuit 202 can be included in the multi-core processing unit 104 as part of a processor in the multi-core processing unit 104. For example, the scatter circuit 202 can be included in a source/primary processor (e.g., processor 0) of the multi-core processing unit 104. This source processor may be tasked by the host 102 to generate one or more requests and to provide the requests to multiple other processors (e.g., processor 1-15) in the multi-core processing unit 104 to retrieve data elements from memory locations of data shards 106a-106k that are assigned to those processors.

The scatter circuit 202 communicates with the host 102 to receive the original list of addresses. For example, the can host 102 receive a batch of inputs to a neural network layer, such as from an external source or controller of system 100 that manages machine-learning operations performed by the system. For example, the machine-learning operations can be for training a neural network to process images or audio data such that the neural network can learn how to recognize a particular object in an image/video or how to detect certain word sequences in an audio stream.

The host 102 receives one or more batches of inputs. In some implementations, the host 102 receives multiple batches of inputs corresponding to one or more samples. For example, a first set of multiple batches of inputs can correspond to one sample 210-1, whereas a second set of multiple batches of inputs can correspond to another sample 210-2. Each sample 210-1, 210-2 can include inputs corresponding to a set of features of an object (e.g., an image or audio stream). For example, each of the samples 210-1 and 210-2 can include respective batches inputs for features corresponding to different regions of the same image or features corresponding to different regions of multiple different images.

Each input in a batch of inputs is stored in a memory location and the location may be identified by an address (e.g., [99], [736], [37], [99], etc.) in the original listing of addresses received by the scatter circuit 202 from the host 102. In some implementations, each of the inputs have a corresponding set of weights that may be stored as data or sparse elements of an embedding table that is sharded across data shards 106a-106k and partitioned across processors 0 through 15. In some implementations, embeddings of the individual features in a batch of inputs are stored in a distributed manner, e.g., across the various data shards of system 100.

For example, the features can be distributed across multiple processor nodes or cores (0-15), with each node being assigned memory addresses for locations storing a shard of the embeddings. As described in more detail below, the host 102 (e.g., a source processor) provides requests, that include one or more subsets of addresses, to one or more of the processors 0-15 (e.g., remote processors) for processing to retrieve data elements for generating a dense matrix.

As noted above, in some prior systems a remote processor that receives duplicate addresses performed data retrieval, arithmetic operations (e.g., multiplication), and associated reduction operations on data obtained for the received addresses, including the duplicate addresses. This led to load-imbalance issues, particularly when the compute load at the remote processors was not balanced with the compute load at a requesting or source processor.

The scatter circuit 202 is configured to parse the original list of addresses to filter out one or more "duplicate" addresses. An address listing received by host 102 includes one or more duplicate addresses corresponding to input features in a batch. For example, an original address list received at system 100 can include addresses [26], [96], [99], [1], [7], [312], [99] and [912] for a batch of inputs. In this example the original address list includes address [99] as a duplicate address in the listing. The scatter circuit 202 is configured to filter the duplicate addresses before bucketing addresses that belong to each remote processor and providing requests to the remote processors to retrieve data elements corresponding to the bucketed addresses.

The scatter circuit 202 identifies one or more duplicate addresses in a listing of addresses for each input in the batch of inputs. For example, a single embedding table can be referenced by multiple features. So, there can be duplicate addresses across multiple different features. For example, an embedding table T can be referenced by features F1 and F2. In this example, an address (e.g., [99]) can be repeated both within the inputs of F1 (in one or more samples) and within the inputs of F2 (in one or more samples).

The scatter circuit 202 is configured to perform deduplication on the original address by filtering out duplicate addresses and providing the unique addresses (identifiers) to the multi-core processing unit 104 for processing at one or more of processors 0-15. For each duplicate address: the scatter circuit 202 generates identifiers that are used to uniquely identify the duplicate addresses in the original address list. The scatter circuit 202 then filters the original address list to generate a filtered address list based on certain identifiers that indicate the duplicate addresses in the original address list, such that the filtered address list includes only unique identifiers corresponding to non-duplicate addresses.

More specifically, for each address in the original list, the scatter circuit 202 uses the hash generator 204 to generate an identifier corresponding to a hash ID. A memory of system 100 can have an address value (e.g., [99]) for different memory offsets (e.g., offset 0, offset 1, etc.). The hash generator 204 can generate the hash ID based on the address value, a memory offset of the address value, or a combination of each. For example, a portion of a hash ID that is generated based on an address value (e.g., [99]) will repeat for a duplicate occurrence of that address in the listing, but will be different for a second portion of the hash ID that is generated based on the memory offset or based on a combination of the address value and the memory offset. In some examples, the scatter circuit 202 can append a respective first portion of a hash ID to an address in the original listing as a prefix to the address. The scatter circuit 202 can recursively scan the address listing to identify a repeat occurrence of an appended prefix and filter out that particular address based on the repeat occurrence.

In some implementations, the appended prefix, or the first portion of a hash ID, is an example of a metadata tag that is used by the scatter circuit 202 to augment addresses in the original listing to generate a filtered address list. The scatter circuit 202 generates a filtered address list for the batch of inputs based on the unique identifiers generated by the hash generator 204. The filtered address list includes only unique identifiers or addresses (e.g., non-duplicate addresses) for memory locations of a data shard 106. The filtered address list is then provided to the multi-core processing unit 104 such that the processors 0-15 receive only unique addresses rather than multiple occurrences of duplicate addresses.

The scatter circuit 202 uses the reverse mapper 206 to generate a reverse map that is used to map a gathered vector back to a particular address in the original list. The reverse mapper 206 is configured to add one or more metadata tags to an address or batch of inputs to enable the reverse mapping. For example, the reverse mapper 206 can augment or modify an address in the original listing by adding a metadata to the address. The metadata can be a metadata tag that includes a hash ID or an annotation that specifies a memory offset of the address. The metadata is used by the reverse mapper 206 to reverse map a specific set of retrieved or computed data (e.g., a gathered vector) back to a corresponding original address prior to the filtering of the duplicate addresses.

In this manner, the circuit 200 provides a special-purpose hardware that is operable to walk each address in the original list of address locations, before deduplication, and use the metadata tags generated by the reverse mapper 206 to gather vector outputs corresponding to a particular input address. As described in more detail below, the circuit 200 is operable to perform a reduction operation on the gathered vectors to generate a dense matrix. For example, the host 102 or an example source processor of the multi-core processing unit 104 can include an example sparse reduce circuit that is configured to perform a reduction of data elements received from the remote cores to form the dense matrix. This is described in more detail below with reference to FIG. 5.

Figure 3:
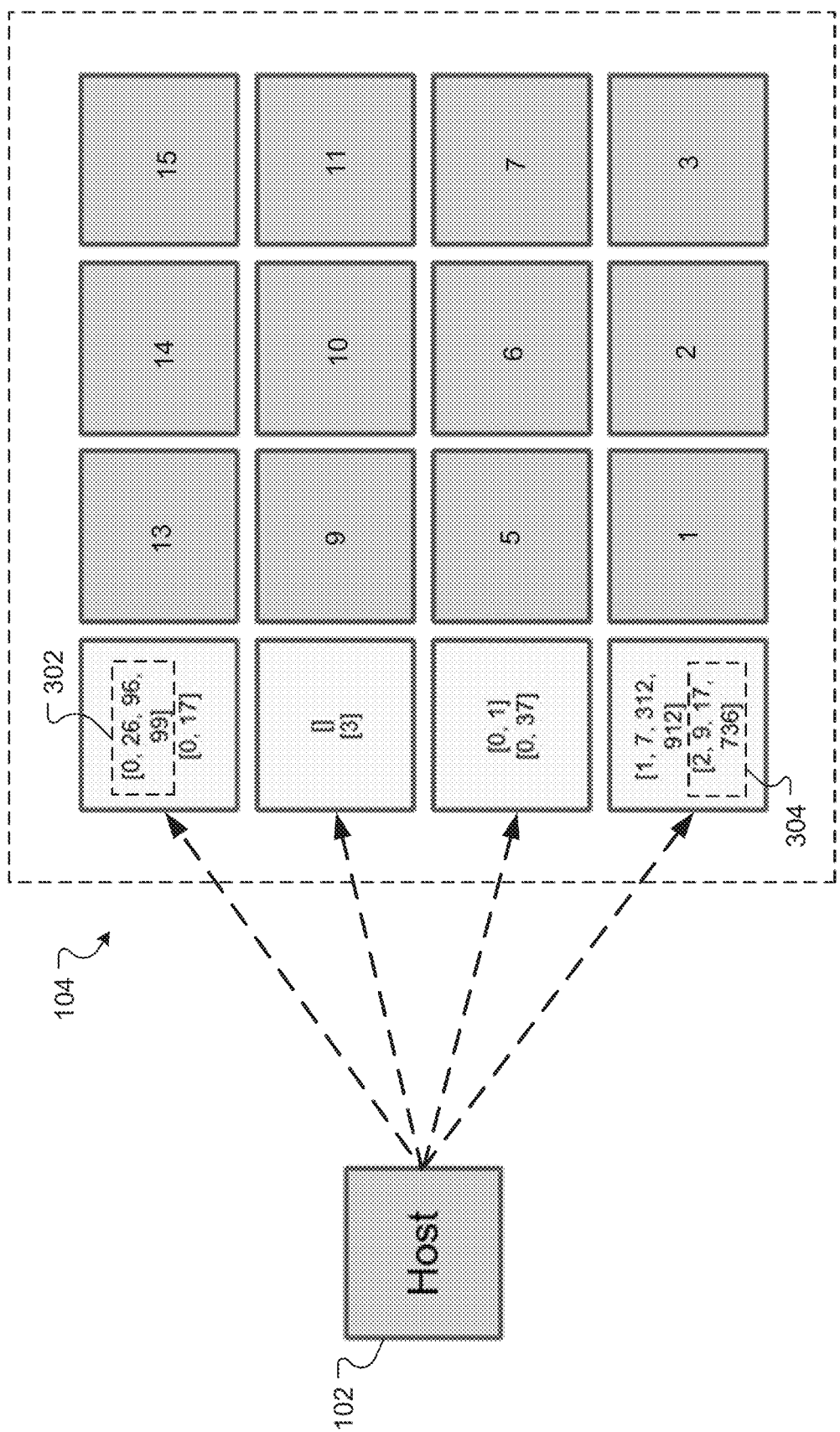
FIG. 3 illustrates an example host broadcasting a set of addresses to processors of an example multi-core processing unit.

FIG. 3 illustrates the host 102 broadcasting a set of addresses to each of processors 0, 4, 8, and 12 of the multi-core processing unit 104. As indicated at FIG. 3, the host 102 sends unique identifiers or addresses for a batch of inputs to a processor of the multi-core processing unit 104. In some implementations, the host 102 can send unique identifiers for respective batches of inputs corresponding to each of sample 210-1 and sample 210-1. For example, the host 102 can send addresses [0, 26, 96, 99] for inputs of a batch 302 to processor 12 and send addresses [2, 9, 17, 736] for inputs of a batch 304 to processor 0. As indicated at FIG. 2, the address for inputs of the batch 302 are for sample 210-1, whereas the address for inputs of the batch 304 are for sample 210-2.

In some implementations, the host 102 is operable to provide different batches of inputs to different processors and to different column groups of processors in the multi-core processing unit 104. For example, the host 102 can send the different batches of inputs to different processors in a sequential manner or in a parallel. Similarly, the host 102 can send the different batches of inputs to different column groups of processors in a sequential manner or in a parallel.

Each of FIGS. 4A-4D illustrate a respective diagram that is associated with an example of a processing scheme 402 that can be implemented at system 100 using at least the host 102 and two or more processors of the multi-core processing unit 104.

As noted above, the processors 0-15 cooperate to retrieve data elements that are mapped to an embedding table, such as a sparse embedding table that includes multiple sparse elements. The data elements are retrieved in response to a remote processor processing a request provided by a source (or requesting) processor. In some cases, the data elements are retrieved to perform embedding layer operations, such as computations for generating output vectors (e.g., dense vectors) that represent embeddings of a neural network or computations for generating partial activations in response to multiplying an input, such as a gain value or activation value, with a weight vector to obtain partial activations.

As also noted above, the embedding table may be a table of weight values that is sharded across data shards 106a-106k, such that individual weight values are stored at respective locations in memory. The data shards 106a-106k can be partitioned to a particular processor 0-15 in the multi-core processing unit 104, such that weight values of the embedding table correspond to a data shard that is assigned to a particular processor 0-15 of the multi-core processing unit 104.

As described below (and with reference to FIG. 5), a request that is provided from a source processor to a remote processor to retrieve a data element can include an address (e.g., [912]) that identifies a memory location of a data shard. The memory location stores data for an input, such as a gain value or an activation. The request is provided to cause a remote processor to retrieve a data element representing the input, such as one of multiple inputs in a batch of inputs received at host 102. In some implementations, the request is provided to cause a remote processor to perform a lookup operation to retrieve a specific or unique weight that corresponds to a particular input in a batch of inputs.

Figure 4A:
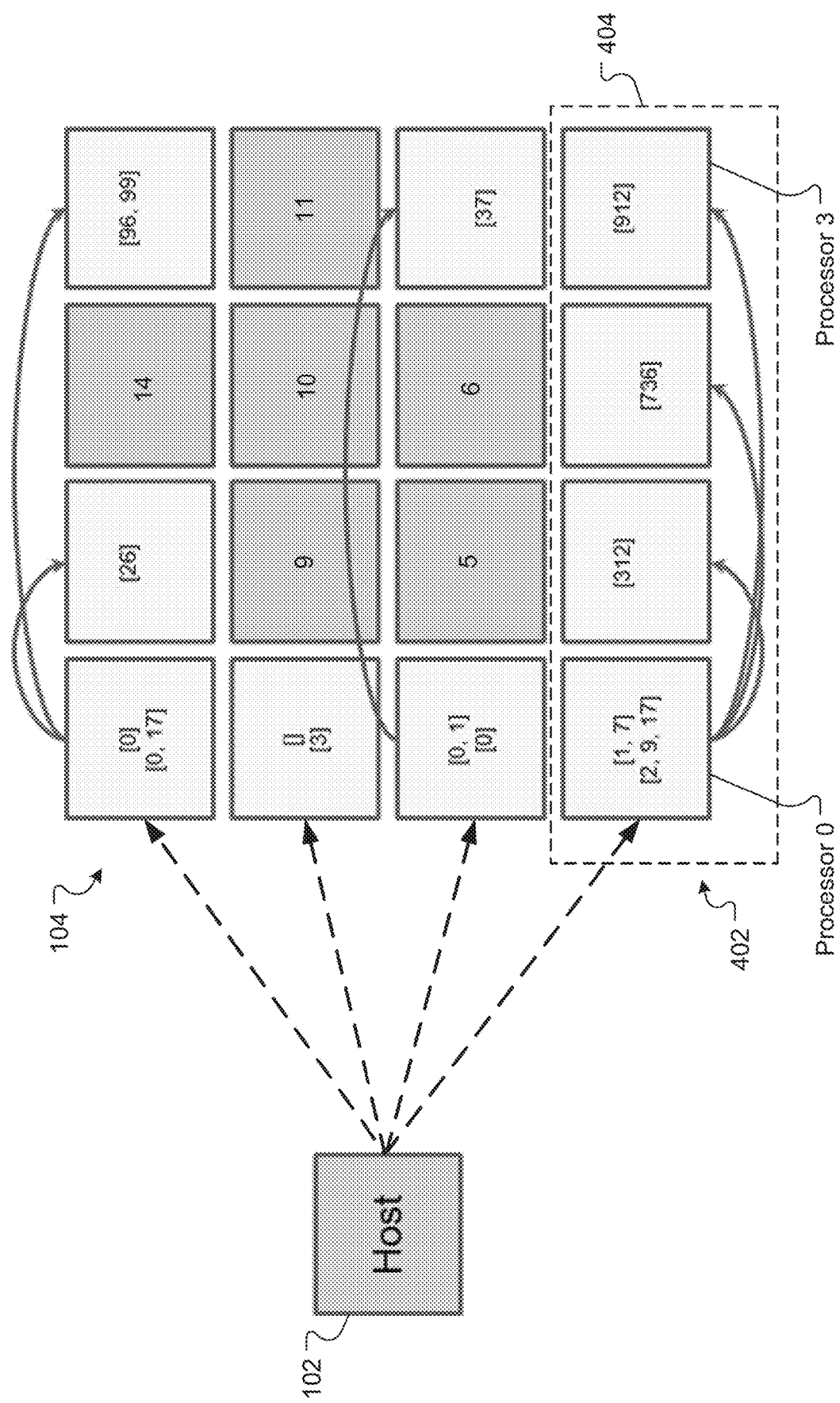
FIGS. 4A-4D illustrate a diagram associated with an example of a processing scheme involving two or more processors of an example multi-core processing unit.

In the example of FIG. 4A, block 402 illustrates an example processing scheme where at least processors 0-3 cooperate to retrieve data elements that are mapped to a portion of an embedding table. In this example, processor 0 can be a source (or requesting) processor that submits a respective request to each of processor 1, processor 2, and processor 3. More specifically, processor 0 is the source processor and each of processor 1, processor 2, and processor 3 are remote processors relative to processor 0.

In some cases, processors 0, 1, 2, and 3 form a subset 404. In this subset 404 each of processor 0, processor 1, processor 2, and processor 3 can be a source processor relative to the other processors in the subset 404, where the other processors are remote processors that receive and process requests from the source processor in the subset 404. In some cases, the source and remote processors in the subset 404 may still receive and process requests from another processor in the multi-core processing unit 104 or from the host 102, which can be a primary, source processor that is not included in the subset.

The example scheme illustrated at block 402 can be a portion of a processing technique implemented at system 100 to generate an output of a neural network layer, such as an embedding output of an embedding neural network layer or an output for a first hidden layer of a neural network. The processing technique includes one or more remote processors providing data elements, including multiple inputs and corresponding look up values, to a requesting processor. The data elements are stored across memory locations of data shards assigned to remote processors.

In some implementations, the data elements are provided to a source processor in response to each of the remote processors performing a look-up to obtain a vector of weights that includes respective weight values for multiplying with a specific input of the multiple inputs. For example, a remote processor may be assigned a portion of memory that holds weights for a kernel matrix to be multiplied with activations stored at a corresponding address in a list of addresses received by the source processor. The input and weight values are multiplied to, for example, generate partial activations for a subsequent neural network layer (described below at least with reference FIG. 4D). An example operation will be described to further illustrate this processing technique.

During an example operation at system 100 for processing multiple batches of inputs, an original listing of multiple addresses is received by the host 102 or by another source processor, such as processor 0 of the multi-core processing unit 104. An address [912] may be included among the multiple addresses in the listing. Address [912] may occur more than once in the received list and for a given batch or sample. Specifically, address [912] can be one of multiple addresses that are duplicated among (i) the set of input features or (ii) the sample of input features. In some implementations, each duplicate occurrence of address [912] in a batch or sample can be for a particular memory offset in a given data shard.

Address [912] can be a location in memory that stores an input/feature value that is an identifier (e.g., a one hot identifier) of a word in a given vocabulary, such as the word "car." For example, an embedding table may map a one hot identifier of the word to an embedding. More specifically, address [912] can store an instance of an input feature that occurs multiple times within the feature values of a given sample and/or within a given batch of inputs. Each occurrence of address [912] can be a feature that has an embedding, e.g., a specific weight or vector of trainable weight values that are stored in an embedding table in the memory.

The system 100 can perform deduplication on the original listing to remove the multiple duplicate occurrences of address [912] to generate a filtered address list that includes only unique addresses. The reverse mapper 206 can append a metadata tag to a specific occurrence of address [912] in a batch or sample to map a gathered vector (e.g., a vector of weights) back to that specific occurrence of address [912] in the original listing. As described in more detail below, an example source processor can use this reverse mapping to locally perform computations, such as multiplication between: (i) an input value stored at this specific occurrence of address [912] and (ii) the gathered vector received from a remote processor.

In general, address [912] can identify a memory location of a data shard assigned to processor 0 and that stores a particular input value. In some implementations, the address [912] in the data shard assigned to processor 0 may also repeat, for example, 100 times in each batch of the multiple batches of inputs, but with reference to different data shards that are assigned to other processors of processing unit 104. For example, address [912] can be a particular address that is common among respective data shards that are assigned to one or more of the processors in the multi-core processing unit 104.

An example source processor, e.g., host 102 or processor 0, may perform 16 memory lookups, one memory lookup for each processor in the multi-core processing unit 104 of system 100, but will not perform computes relating to reductions or matrix multiplication. In the example of FIG. 4A (and FIG. 4C discussed below), processor 3 may send, to processor 0, only its respective input value (e.g., activation or gain) and weight value(s) that correspond to the unique address that may be generated for the multiple duplicate occurrences of address [912] in a particular batch.

Figure 4B:
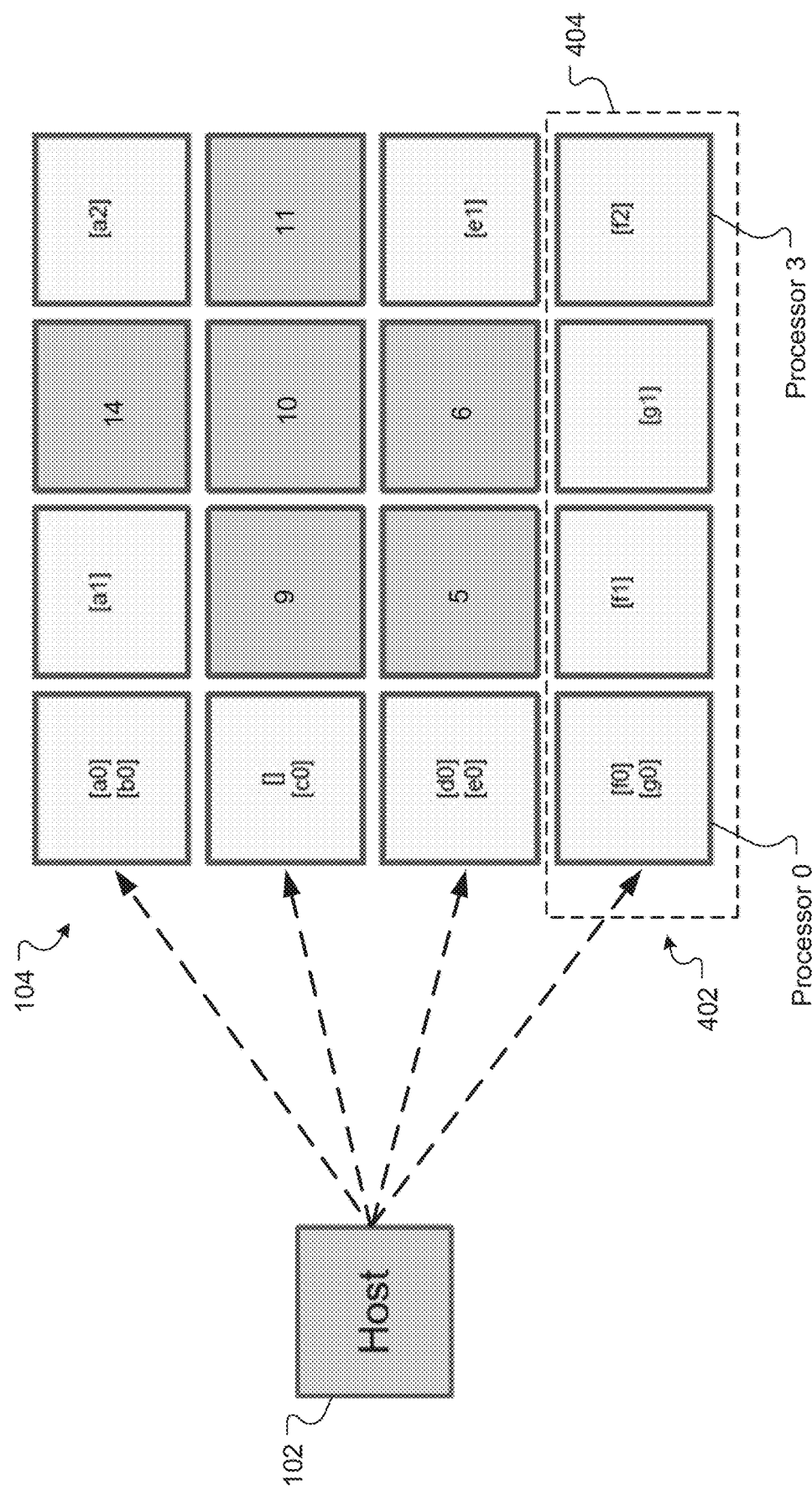

In the example of FIG. 4B, a remote processor 104n is configured to locally reduces its own lookup values based on instructions from a requesting processor. In some implementations, each of the processors in the multi-core processing unit 104 can represent a neural network processor chip that is assigned to lookup and locally reduce data elements stored at a particular data shard 106a-106k. A respective remote processor is configured to lookup and locally reduce its data elements of an embedding table based on instructions provided by the host 102 or based on instructions received directly from a requesting/source processor in a subset that includes the respective remote processor.

For example, processor 3 can be a respective remote processor in a subset of processors that include processor 0, processor 1, and processor 2. In this example, processor 0 may be a requesting processor in the subset that includes processor 3, which is a remote processor relative to at least processor 0. In this manner, processor 3 is configured to lookup and locally reduce data elements, such as unique weight values for the input stored at address [912], to generate an example weight vector [f2].

Figure 4C:
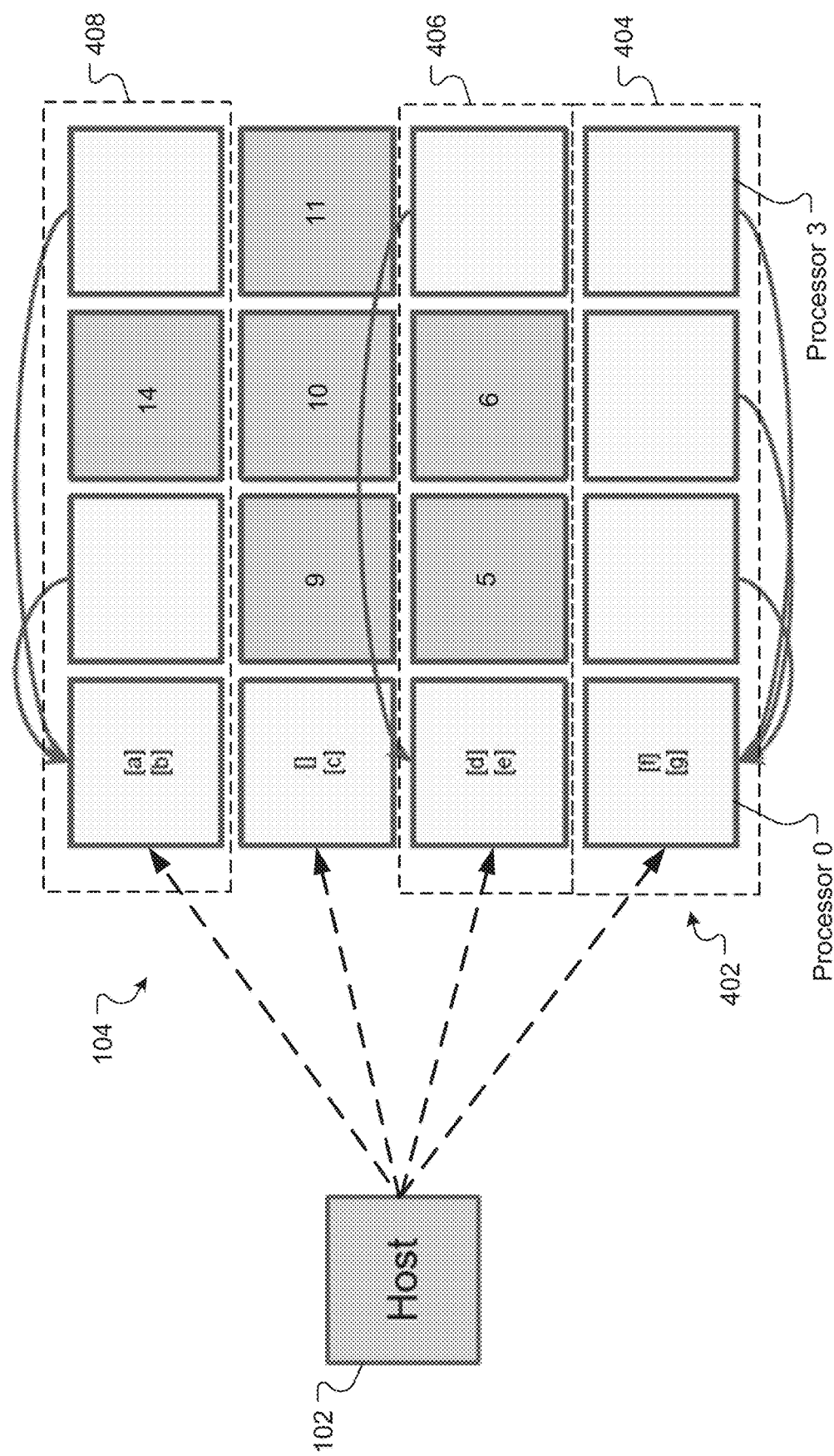

In the example of FIG. 4C, a source or requesting processor (e.g., processor 0) receives the data elements that are locally reduced at each remote processor and performs one or more operations on those data values. In some implementations, the requesting processor is configured to perform an additional reduction operation on the received values. For example, when the input stored at address [912] and the corresponding lookup data is retrieved and locally reduced by processor 3 to generate the values of vector [f2], the system 100 is operable to determine a reduction for the input relative to the corresponding sample or batch of inputs to which the input is assigned.

For example, using the requesting processor 0 of the subset 404, the system 100 can determine that the input [912] has to be reduced five times for sample 210-1 and two times for sample 210-2. Additionally, the requesting processor 0 is configured to perform a reduction on all data values received from each remote processor in the subset 404. For example, the requesting processor 0 is configured to locally reduce each of weight vector [f2], weight vector [g1], and weight vector [f1] that is received respectively from remote processor 1, remote processor 2, and remote processor 3. In some implementations, the requesting processor 0 is configured to lookup its own data elements, such as unique weight values for the inputs stored at addresses [1], [7], [2],

[9], and [17], and locally reduce the lookup values across these features to generate example weight vectors [f0] and [g0]. The requesting processor can perform a reduction across its own lookup values and the data values received from each of the remote processors in the subset 404.

In the example of FIG. 4C, each of subset 406 and subset 408 may be used to implement processing schemes that are similar to, or the same as, the processing scheme 402 described above. For example, in subset 406 processor 7 can be a remote processor that is configured to lookup and locally reduce data elements, such as unique weight values for the input stored at address [37], to generate an example weight vector [e1]. In subset 406, a source or requesting processor (e.g., processor 4) receives the data elements for vector [e1] that were locally reduced at remote processor 7 and performs one or more operations on those data values. Processor 4 may then generate example weight vectors [d0] and [e0] based on one or more concatenation or reductions operations performed across embeddings retrieved for various input values in a batch or sample.

In some implementations, each of processors 1-15 may send, to processor 0, its respective input value (e.g., activation or gain) and weight value(s) that correspond to the unique address that is generated for the multiple duplicate occurrences of address [912] in a particular batch. In other implementations, each of processors 0-15 may be assigned a respective batch for processing and will each perform its respective compute for the 100 repetitions of address [912] in their respective batches.

The processing techniques described with reference to FIGS. 4A-4D can allow for computation in a distributed system of processors to be performed by a particular primary processor that owns the processing of multiple batches of inputs instead of by the remote processor that is mapped to a particular portion of memory that holds weight values (e.g., parameters) corresponding to one or more inputs in a batch of inputs. These techniques can also translate to improved load balance and scalability of system 100.

Figure 4D:
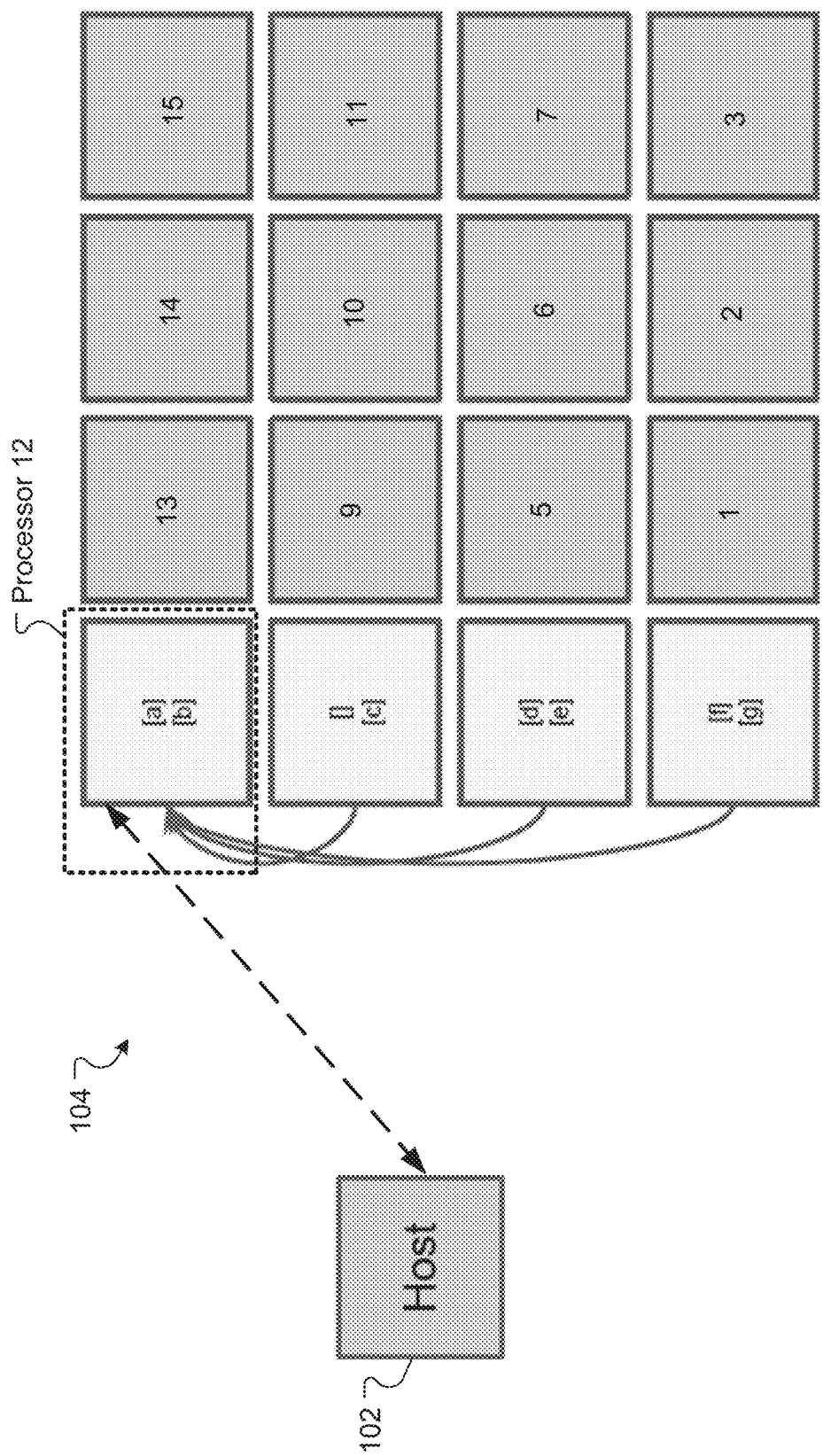

In the example of FIG. 4D processor 12 can represent a processing node of an example distributed processing system of system 100. In some implementations, processor 12 may be a primary processor that owns the processing of multiple batches of inputs. Processor 12 is configured to receive each of the vector outputs (e.g., dense vectors) that are reduced by a respective requesting processor 104n in the multi-core processing unit 104. More specifically, processor 12 can receive vector outputs corresponding to data elements of each output matrix (representing embeddings of a neural network) that was reduced locally by a respective remote processor.

The processor 12 is configured to perform computations for generating partial activations in response to multiplying an input, such as a gain value or activation value, with weight values of a weight vector to obtain partial activations. For example, the processor 12 is configured to generate one or more sets of partial activations based on multiplications between inputs and weight values of weight vectors [a] and [b].

Figure 5:
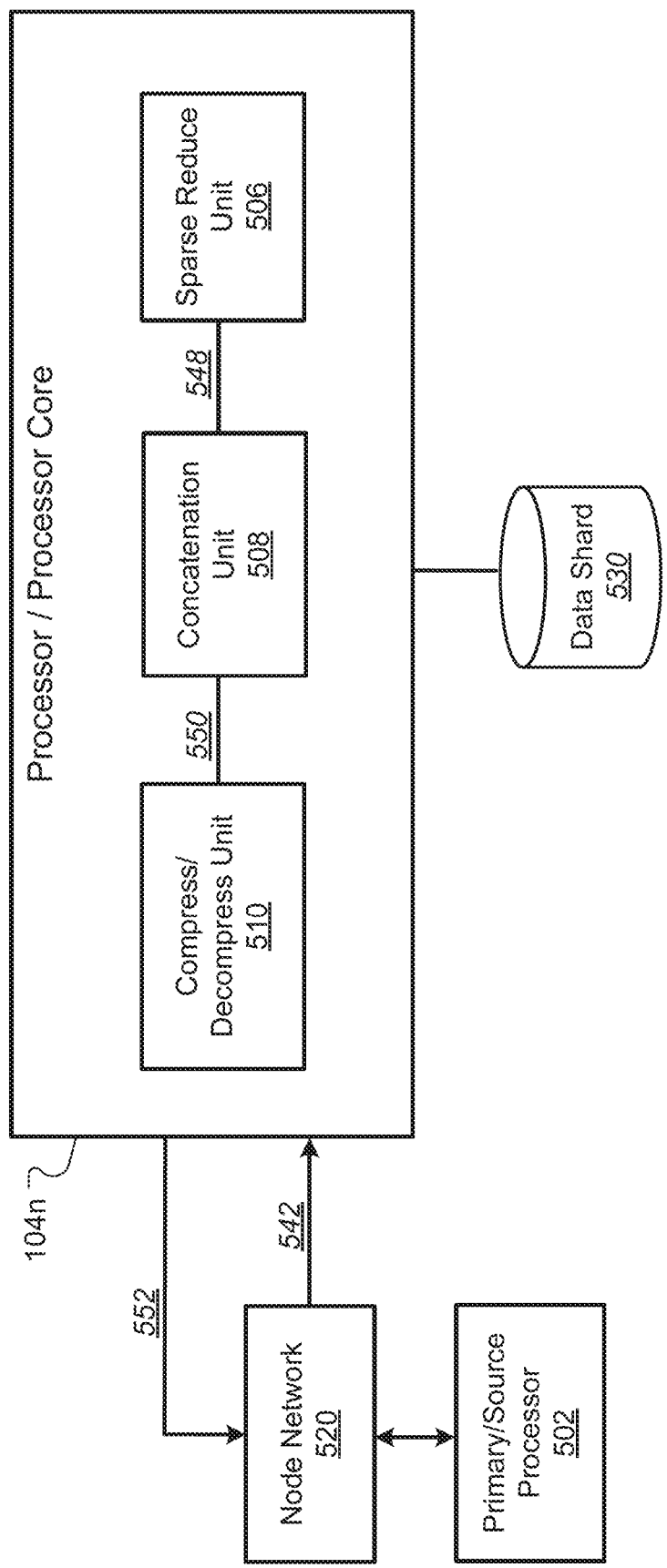
FIG. 5 illustrates an example processor of an example multi-core processing unit.

FIG. 5 illustrates an example processor 104n of the multi-core processing unit 104, where n is an integer greater than one. For example, the processor 104n may be any one of the processors 0-15, described above with reference to FIG. 2. In general, the processor 104n is configured to receive, from a node network 520, a request 542 to fetch or retrieve data (e.g., sparse elements) stored in one or more data shards 530.

For example, a source processor 502 sends a request 542 to a processor 104n in the node network 520 for a dense matrix generated using sparse elements. The node network 520 may be a two-dimensional mesh network. In some implementations, the request 542 to fetch the data includes an instruction to transform fetched sparse elements into a dense matrix. As described above, this request to transform the fetched sparse elements into a dense matrix can be performed during training of an embedding layer to learn embeddings. For example, the fetched elements may be weight values of an embedding table that are transformed into an embedding vector based at least on a mapping of input features to embedding vectors. The source processor 502 may broadcast the request 542 to the processor 104n. The routing of the broadcast request 542 may be similar to the descriptions for FIG. 2 with reference to the host 102 providing a request to one or more processors 104n. In some implementations, the source processor 502 may be host 102 or another processor 104n included in the multi-core processing unit 104.

In general, the processor 104n is configured to receive the request 542 to fetch data elements stored in one or more data shards 530, and determine whether the processor 104n is assigned to access the addresses for locations in memory that store the data indicated by the request 542. In some implementations, the processor 104n may determine whether it is assigned to access the data elements indicated by the request 542 by using a lookup table. For example, if an address of a particular requested data element (e.g., address [99] at memory offset 1 of lookup table No. 5) is included in the lookup table, the processor 104n may send a signal to an example data retrieval unit of the processor to cause the data retrieval unit to retrieve the particular requested data element. In some implementations, the processor 104n may be configured to broadcast the received request 542 to another processor 104n on the node network 520.

The processor 104n is configured to retrieve one or more requested data elements, from a particular data shard 530 that is assigned to the processor 104n, in response to processing the request 542. In some implementations, the processor 104n is a vector processor, vector-processing unit (VPU), array processing unit, or any suitable data computing resource for processing arrays and matrices of vector elements. In some implementations, each of the processors 104n included in the multi-core processing unit 104 may be assigned to specific data elements, e.g., of an embedding table, stored in data shards 530 based on the addresses and corresponding memory locations that are used to store the data elements.

In some implementations, the source processor 502 may generate one or more requests 542 for data elements corresponding to multiple batches of inputs to be retrieved and processed using one or more of the processors 104n. In some cases, each batch of inputs can be associated with a respective request 542 for a subset of the requested data elements. Each processor 104n is configured to independently retrieve the assigned data elements from its assigned data shards 530. In some implementations, the processor 104n causes the retrieved data to be forwarded to one or more units of the processor for further processing as described in more detail below.

As illustrated at FIG. 5, the processor 104n includes a sparse reduce unit 506, a concatenation unit 508, and a compress/decompress unit 510. The processor 104n can forward the retrieved data elements to the sparse reduce unit 506. The sparse reduce unit 506 is configured to reduce the dimensions of the retrieved data elements. For example, the processor 104n may generate a vector element having dimensions of 100-by-1. The sparse reduce unit 506 is operable to receive fetched data elements having dimensions of 100-by-k, and to generate sparse-reduced elements 548 by reducing the dimensions of the fetched data elements 346 to 100-by-1 by logic operations, arithmetic operations, or a combination of both. The sparse reduce unit 506 is configured to output the sparse-reduced elements 548 to the concatenation unit 508.

The concatenation unit 508 is configured to rearrange and concatenate the sparse-reduced elements 548 to generate concatenated elements 550. For example, the processor 104n can be configured to access data elements that include an input to a neural network layer and a corresponding set of weight values (e.g., sparse elements No. 1 to No. 100 of database table No. 1). Processor 104n is operable to return the retrieved sparse element No. 10 (e.g., a first weight value) to the sparse reduce unit 506 before returning the retrieved sparse element No. 5 (e.g., a second weight value). The concatenation unit 508 is configured to rearrange the later-received sparse element No. 5 to be ordered before the earlier-received sparse element No. 10, and concatenate sparse elements No. 1 to No. 100 as the concatenated elements 550.

The compress/decompress unit 510 is configured to compress the concatenated elements 550 to generate a dense matrix 552 for the node network 520. For example, the compress/decompress unit 510 is operable to compress the zero values in the concatenated elements 550 to improve the bandwidth of the node network 520. In some instances, multiple zero values may by generated in response to an arithmetic operation between an input and a weight, such as multiplication between an input having a zero value and a weight value, that yields a matrix of concatenated elements 550 with multiple zeros as results of the multiplication. The compress/decompress unit 510 can compress the matrix to generate an example dense matrix 552 for the node network 520.

In some implementations, the compress/decompress unit 510 may decompress a received dense matrix. For example, a first processor 104n (e.g., processor 9 at FIG. 2) may receive a dense matrix from a neighboring, second processor 104n (e.g., processor 10 at FIG. 2) via the node network 520. The neighboring, second processor 104n may decompress the received dense matrix, and may concatenate the decompressed dense matrix with the concatenated elements 550 to form updated concatenated elements that can be compressed and then output to the node network 520.

FIG. 6 is a flow diagram that illustrates an example process 600 for generating an output of a neural network layer. Process 600 can be implemented or executed using the system 100 described above. Descriptions of process 600 may reference the above-mentioned computing resources of system 100. In some implementations, steps or actions of process 600 are enabled by programmed firmware or software instructions, which are executable by one or more processors of the devices and resources described in this document.

Referring now to process 600 a host of system 100 receives a batch of inputs to a neural network layer (602). For example, host 102 can receive one or more batches of inputs for processing by the multi-core processing unit 104. Each input in the one or more batches of inputs is stored in a memory location identified by an address. For at least one batch of inputs, a circuit of system 100 identifies one or more duplicate addresses in a listing of addresses for each input in the batch of inputs (604). For example, the scatter circuit 202 is operable to scan a listing of addresses to identify one or more duplicate addresses in the listing of addresses for each input in the batch of inputs.

For each duplicate address that identified, the circuit generates a unique identifier that identifies the duplicate address in the listing of addresses (606). For example, scatter circuit 202 is operable to generate a respective unique identifier for each duplicate address to identify a particular address as being duplicated in the listing of addresses. The listing of addresses can be for a batch of inputs that form a sample of input features that includes multiple sets of input features. The circuit of system 100 is operable to generate the unique identifier for each duplicate address across respective sets of input features in the sample of input features.

System 100 generates a filtered address list for the batch of inputs based on one or more unique identifiers generated by the circuit (608). For example, the host 102 interacts with the scatter circuit 202 to receive a corresponding unique identifier for each duplicate address and generates the filtered address list for the batch of inputs based at least on the one or more unique identifiers generated by the scatter circuit 202.

System 100 obtains, for the batch of inputs, first inputs from memory locations identified by addresses corresponding to the unique identifiers based on the filtered address list (610). For example, and based on the filtered address list, the system 100 can use a particular processor assigned to a corresponding data shard to obtain first inputs from memory locations of the data shard that are identified by addresses corresponding to the unique identifiers.

To obtain the first inputs the system 100 a requesting processor can provide a request to a remote processor, for processing by the remote processor, to obtain the first inputs. The request can include an address for a first input that corresponds to a unique identifier. In some cases, the request and the address may be sent separately, but concurrently or in parallel. In some cases, the request and the address may be sent sequentially, with one preceding the other.

The requesting processor receives, from the remote processor, the first input stored at a memory location of a data shard assigned to the remote processor in response to the remote processor processing the request. In some implementations, the requesting processor is operable to perform one or more reduction operations to generate an output of a neural network layer from first inputs obtained from the data shard, as described in more detail below.

The system 100 can determine a partitioning of addresses in the filtered list among each processor of the multiple processors in the multi-core processing unit 104. For example, the system 100 can determine that data elements associated with address [26] are partitioned to data shards assigned to processor 13, data elements associated with addresses [96] and [99] are partitioned to data shards assigned to processor 15, or that data elements associated with address [912] are partitioned to data shards assigned to processor 3.

In this manner, and for each partition of addresses, the system can obtain the first inputs from memory locations identified by addresses in the partition of addresses using a respective processor that is assigned to retrieve inputs and other corresponding data elements (e.g., weight values) from data shards assigned to the respective processor. For example, each partition of addresses can be assigned to a data shard of activation values or gain values that correspond to vector elements of a multi-dimensional sparse tensor. In some implementations, each data shard of activation or gain values is assigned to a particular processor for multiplying with a corresponding weight vector to perform neural network computations.

System 100 generates an output, e.g., an embedding output, of the neural network layer from the obtained first inputs (612). In some implementations, the neural network layer is an embedding layer of the neural network and the embedding output includes an embedding feature vector. The scatter circuit 202 is configured to determine a reverse mapping of a unique identifier to duplicate addresses for specific inputs in a batch of inputs to the embedding layer. In some implementations, the reverse mapping of the unique identifier to duplicate addresses is determined for specific inputs across the multiple sets of input features.

The system 100 is operable to generate one or more vectors (e.g., embedding feature vectors) as outputs of the embedding layer based on the reserve mapping of the unique identifier to the duplicate addresses for the specific inputs. For example, generating the outputs (e.g., embedding outputs) of a neural network layer based on the reserve mapping can include parsing the listing of addresses that includes the duplicate addresses to map embedding feature vectors generated for duplicate addresses, corresponding to unique identifiers, back to the specific inputs in the batch of inputs to the neural network layer.

In some examples, generating an output of an embedding layer can include generating one or more dense matrices in response to processing data associated with a sparse table of embedding values. The data associated with the table can be represented in the form of a matrix. The processors and computing resources of system 100 can be used to manipulate the data based on linear algebra algorithms, including matrix multiplication. A matrix may be a one-dimensional vector or a multi-dimensional matrix. A matrix may be represented by a data structure, such as a database table or a variable. The embedding table can be sharded in, for example, a row and column dimension and stored in a portion of memory that is mapped to a particular processor among multiple processors that form the multi-core processing unit 104.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus.

Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "computing system" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment.

A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. Some elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for performing neural network computations using processor cores in a multi-core processing unit of a hardware integrated circuit configured to implement a neural network, the method comprising:
   receiving a request comprising a set of addresses;
   generating a filtered address list based on a filtering operation performed on the set of addresses;
   retrieving, by a first processor core, a first vector of weights corresponding to a first input feature identified by a first address in the filtered address list;
   performing a neural network computation using the first input feature and the corresponding first vector of weights; and
   generating an output for a layer of the neural network based on the neural network computation.

2. The method of claim 1, further comprising:
   retrieving, by a second processor core, a second vector of weights corresponding to a second input feature identified by a second address in the filtered address list; and
   performing a neural network computation using the second input feature and the corresponding second vector of weights.

3. The method of claim 1, wherein generating the filtered address list comprises:
   identifying duplicate addresses in the set of addresses using a scatter circuit of a host processor of the hardware integrated circuit; and
   filtering out the duplicate addresses based on a metadata tag that augments one or more duplicate addresses in the set of addresses to generate the filtered address list.

4. The method of claim 1, wherein:
   i) the layer of the neural network is an embedding layer; and
   ii) the first vector of weights and the second vector of weights are distinct embedding vectors for the embedding layer.

5. The method of claim 4, wherein:
   i) the first vector of weights is stored in a first data shard corresponding to the first processor core; and
   ii) the second vector of weights is stored in a second, different data shard corresponding to the second processor core.

6. The method of claim 1, further comprising:
   distributing addresses in the filtered address list among the first processor core and a second processor core of the multi-core processing unit.

7. The method of claim 2, wherein the neural network computation performed by the first processor core is a first neural network computation and the neural network computation performed by the second processor core is a second neural network computation, the method further comprises:
   receiving, at the first processor core from the second processor core, a result of the second neural network computation performed at the second processor core;
   performing, at the first processor core, a reduction operation based on a result of the first neural network computation and the result of the second neural network computation; and generating the output for the layer of the neural network based on a result of the reduction operation.

8. The method of claim 7, further comprising:
communicating, from the first processor core to a third processor core of the multi-core processing unit, the result of the reduction operation;
generating, at the third processor core, partial activations based on the result of the reduction operation received from the first processor core.

9. A system for performing neural network computations using processor cores in a multi-core processing unit of the system and a hardware integrated circuit configured to implement the neural network, the system comprising:
a processor; and
a non-transitory machine-readable medium for storing instructions that are executable by the processor to cause performance of operations comprising:
receiving a request comprising a set of addresses;
generating a filtered address list based on a filtering operation performed on the set of addresses;
retrieving, by a first processor core, a first vector of weights corresponding to a first input feature identified by a first address in the filtered address list;
performing a neural network computation using the first input feature and the corresponding first vector of weights; and
generating an output for a layer of the neural network based on the neural network computation.

10. The system of claim 9, further comprising:
retrieving, by a second processor core, a second vector of weights corresponding to a second input feature identified by a second address in the filtered address list; and
performing a neural network computation using the second input feature and the corresponding second vector of weights.

11. The system of claim 9, wherein generating the filtered address list comprises:
identifying duplicate addresses in the set of addresses using a scatter circuit of a host processor of the hardware integrated circuit; and
filtering out the duplicate addresses based on a metadata tag that augments one or more duplicate addresses in the set of addresses to generate the filtered address list.

12. The system of claim 9, wherein:
i) the layer of the neural network is an embedding layer; and
ii) the first vector of weights and the second vector of weights are distinct embedding vectors for the embedding layer.

13. The system of claim 12, wherein:
i) the first vector of weights is stored in a first data shard corresponding to the first processor core; and
ii) the second vector of weights is stored in a second, different data shard corresponding to the second processor core.

14. The system of claim 9, further comprising:
distributing addresses in the filtered address list among the first processor core and a second processor core of the multi-core processing unit.

15. The system of claim 10, wherein the neural network computation performed by the first processor core is a first neural network computation and the neural network computation performed by the second processor core is a second neural network computation, the operations further comprising:
receiving, at the first processor core from the second processor core, a result of the second neural network computation performed at the second processor core;
performing, at the first processor core, a reduction operation based on a result of the first neural network computation and the result of the second neural network computation; and
generating the output for the layer of the neural network based on a result of the reduction operation.

16. The system of claim 15, further comprising:
communicating, from the first processor core to a third processor core of the multi-core processing unit, the result of the reduction operation; and
generating, at the third processor core, partial activations based on the result of the reduction operation received from the first processor core.

* * * * *